(12) United States Patent
Murat

(10) Patent No.: US 12,540,735 B2
(45) Date of Patent: Feb. 3, 2026

(54) MOUNTING CLIP

(71) Applicant: OMERIN SAS, Ambert (FR)

(72) Inventor: Frédéric Murat, Mornant (FR)

(73) Assignee: OMERIN SAS, Ambert (FR)

( * ) Notice: Subject to any disclaimer, the term of this patent is extended or adjusted under 35 U.S.C. 154(b) by 0 days.

(21) Appl. No.: 18/615,295

(22) Filed: Mar. 25, 2024

(65) Prior Publication Data

US 2024/0318828 A1 Sep. 26, 2024

(30) Foreign Application Priority Data

Mar. 24, 2023 (FR) ...................................... 2302825

(51) Int. Cl.
*F24C 15/02* (2006.01)
*F16B 5/12* (2006.01)

(52) U.S. Cl.
CPC ............ *F24C 15/021* (2013.01); *F16B 5/125* (2013.01)

(58) Field of Classification Search
CPC ........ F24C 15/021; F16B 5/125; F16B 2/248; F16J 15/0812; F16J 15/061
See application file for complete search history.

(56) References Cited

U.S. PATENT DOCUMENTS

| | | | | |
|---|---|---|---|---|
| 2,197,590 A * | 4/1940 | Place | ...................... | F16B 5/125 52/718.07 |
| 3,167,824 A * | 2/1965 | Berwanger | .............. | B60J 10/30 49/492.1 |
| 3,251,105 A * | 5/1966 | La Penna | ................. | F16B 5/125 24/296 |
| 3,494,651 A * | 2/1970 | Fork | ......................... | E04B 5/48 52/126.2 |
| 5,205,075 A * | 4/1993 | Moyer | .................... | F16J 15/061 49/492.1 |
| 5,806,149 A * | 9/1998 | Schultz | .................... | F16B 2/248 49/492.1 |
| 5,915,698 A * | 6/1999 | James | .................... | F24C 15/021 49/492.1 |
| 5,918,885 A * | 7/1999 | Radke, II | ................. | D04C 1/06 24/570 |
| 6,533,289 B2 * | 3/2003 | Bono, Jr. | ............... | F16J 15/061 277/630 |

(Continued)

FOREIGN PATENT DOCUMENTS

| | | |
|---|---|---|
| CN | 105422557 A | 3/2016 |
| FR | 3039255 A1 | 1/2017 |

OTHER PUBLICATIONS

French Search Report corresponding to FR Application No. 2302825; Mailing Date, Nov. 2, 2023.

(Continued)

*Primary Examiner* — David M Upchurch
(74) *Attorney, Agent, or Firm* — CANTOR COLBURN LLP

(57) ABSTRACT

A mounting clip for a domestic oven gasket formed in a segment of steel wire, the mounting clip including a base intended to be inserted into a braided tubular gasket, the base having a polygonal geometry inscribed in a plane P and, connected to said base, a head intended to be inserted into an opening made in an oven structure, the head having two legs inscribed in a plane P' orthogonal to the plane P and a tip oriented in a plane P" which forms an acute angle α with the plane P'.

7 Claims, 4 Drawing Sheets

(56) References Cited

U.S. PATENT DOCUMENTS

| | | | |
|---|---|---|---|
| 7,093,838 B2 | 8/2006 | Hight, Jr. et al. | |
| 7,104,546 B2 * | 9/2006 | Bono, Jr. | F24C 15/021 24/296 |
| 8,601,646 B2 * | 12/2013 | Wang | F16B 2/248 49/492.1 |
| 9,086,149 B2 * | 7/2015 | Qiang | F16J 15/061 |
| 10,928,071 B2 * | 2/2021 | Mi | F25D 23/087 |
| 2004/0070155 A1 * | 4/2004 | Bono, Jr. | F16J 15/061 277/630 |
| 2004/0094905 A1 * | 5/2004 | Weil | F16J 15/027 277/628 |
| 2005/0198909 A1 * | 9/2005 | Qiang | F24C 15/021 49/492.1 |
| 2009/0079141 A1 * | 3/2009 | Qiang | F16J 15/061 29/469 |
| 2009/0144949 A1 * | 6/2009 | Zhou | F24C 15/021 24/458 |
| 2010/0251621 A1 * | 10/2010 | Donoho | F24C 15/021 24/457 |
| 2018/0180217 A1 | 6/2018 | Guan | |
| 2022/0349585 A1 * | 11/2022 | Bono, Jr. | F24C 15/021 |
| 2022/0373188 A1 * | 11/2022 | Hellwig | F16B 2/248 |

OTHER PUBLICATIONS

Written Opinion corresponding to FR Application No. 2302825; Mailing Date Mar. 24, 2023.
European Notification pursuant to Article 94(3) EPC corresponding to EP Application No. 24 164 485.4; Issue date, Sep. 26, 2025, 18 pages.

\* cited by examiner

MOUNTING CLIP

CROSS REFERENCE TO RELATED APPLICATIONS

This application claims priority under 35 U.S.C. § 119 to the following French Patent Application No. 2302825, filed on Mar. 24, 2023, the entire contents of which are incorporated herein by reference thereto.

TECHNICAL FIELD

The present disclosure relates to a mounting clip for an oven gasket, an oven gasket comprising this mounting clip, and a method of manufacturing this oven gasket.

BACKGROUND OF THE DISCLOSURE

Domestic ovens are provided with gaskets and seals against which the oven door rests when the oven is closed.

Oven door gaskets traditionally comprise a tubular metal mesh over which is woven a textile lining made of a high-temperature resistant material. To fix and hold these gaskets in position on the oven, it is known to use a clip, usually made by bending a metal wire. This clip has a retaining part in the gasket and a retaining part in an opening in the oven structure, as shown for example in document FR3039255.

Given the high temperature that can prevail in the oven—up to 500° C. in a pyrolysis cleaning cycle—it is important that the door seal cannot be removed by a user.

It is also important that this seal is easy to fit to the oven structure.

SUMMARY

In this context, the purpose of the present disclosure may seek to improve the attachment of a door gasket and seal to a domestic oven.

An aspect of the disclosure concerns a domestic oven gasket mounting clip formed from a segment of steel wire, the clip comprising a base for insertion into a braided tubular gasket, the base having a polygonal geometry inscribed in a plane P and, connected to the said base, a head intended to be inserted into an opening made in an oven structure, the head having two uprights inscribed in a plane P' orthogonal to the plane P and a point oriented in a plane P''' which forms an acute angle α with the plane P'.

In some preferred embodiments, the tip comprises two strands that converge from the end of the uprights towards the base. The spike acts as an anchor when the mounting clip is engaged in an opening made in the structure of an oven.

In some embodiments, the head has an upright connected to the base and an upright divergently oriented towards the base. The presence of a divergently oriented upright allows the head to be stressed in a longitudinal direction and thus provides additional locking.

In some embodiments, the base has a pentagonal geometry comprising a transverse strand connected to two parallel longitudinal strands; each longitudinal strand is extended by an oblique strand, one of the oblique strands being connected to the head.

In some embodiments, the upright is connected to an oblique strand ensuring the connection between the base and the head, while the opposite upright is oriented in a divergent oblique manner in the direction of the base.

In some embodiments, the head is provided with a spout which extends perpendicularly from the upright.

Alternatively, the nose is tangential to the transverse strand.

Another aspect of the disclosure relates to a thermal insulation gasket for a domestic oven, the gasket comprising at least one clip having one or more of the aforementioned characteristics.

BRIEF DESCRIPTION OF THE DRAWINGS

Examples are described in more detail below with reference to the appended drawings.

FIG. 6 is a view of a gasket fitted with a clip;

DETAILED DESCRIPTION

In its different embodiments, the mounting clip 1 can be formed from a segment of stainless steel wire, which may, for example, have a diameter of 0.8 mm. This segment of steel wire is shaped by bending to form the clip 1.

Figure 1:
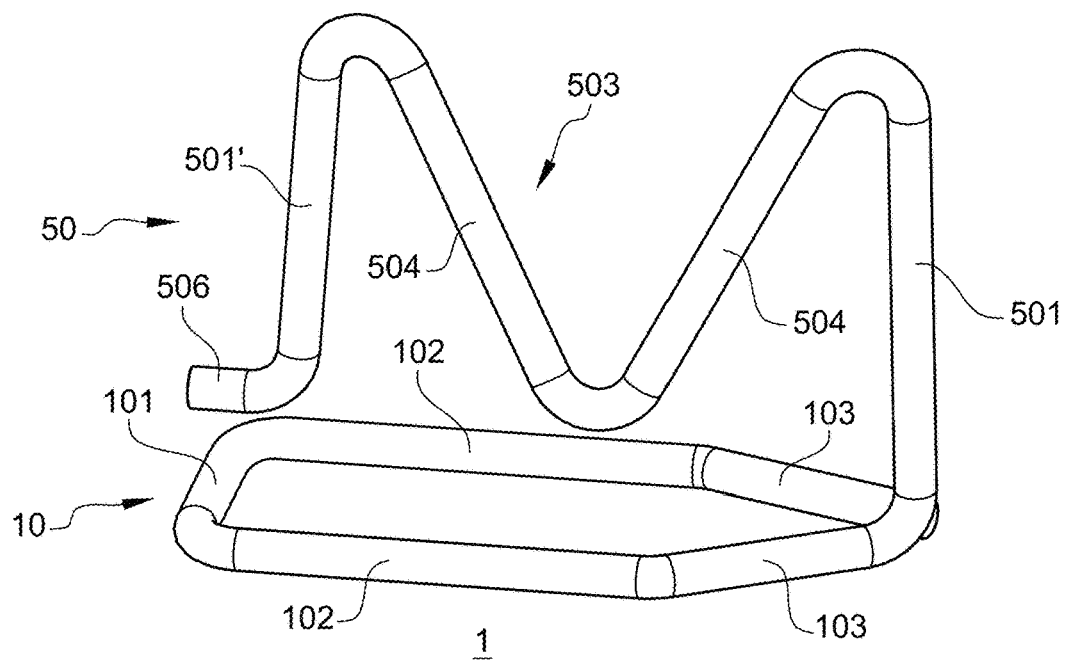
FIG. 1 is a front view of a mounting clip according to one embodiment.

As can be seen, for example, in FIG. 1, the mounting clip 1 comprises a base 10 intended to be inserted into a gasket 200 which will be described later and a head 50 intended to be inserted into a rectangular opening 300 formed in the structure of an oven or of an oven door.

Figure 2:
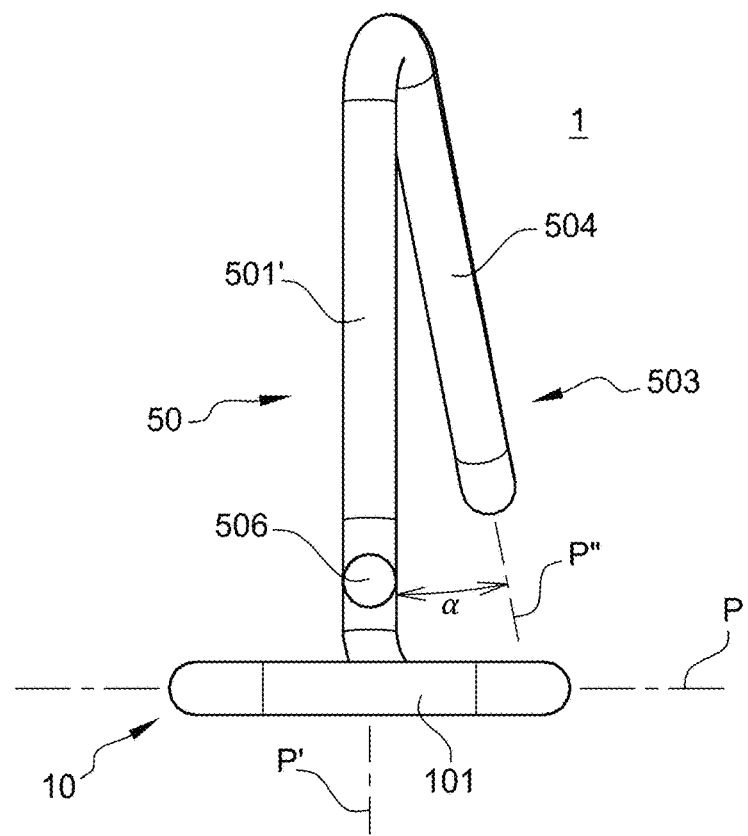
FIG. 2 is a side view of the clip shown in FIG. 1.
Figure 3:
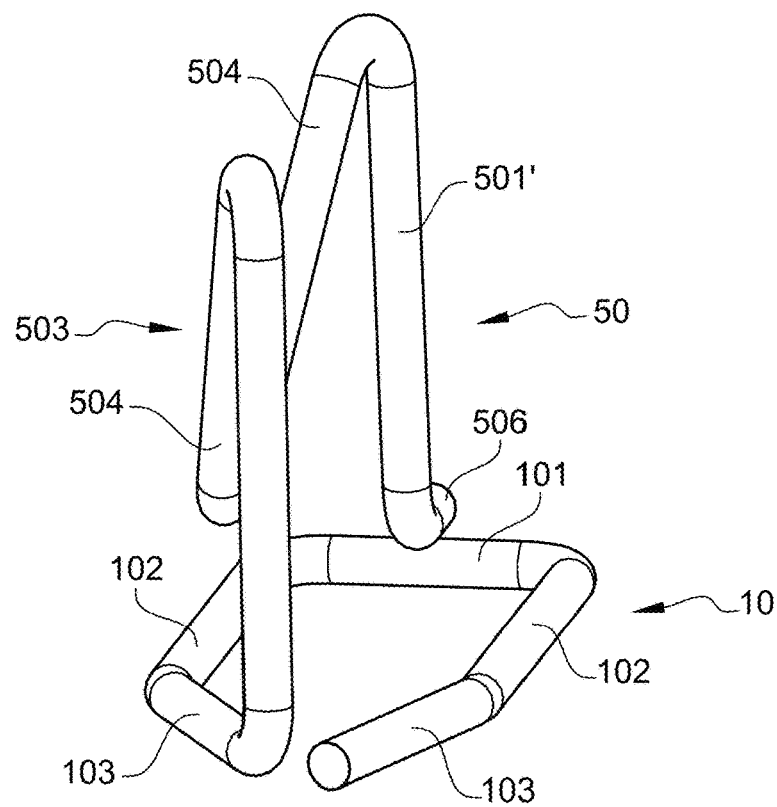
FIG. 3 is a perspective view of the clip in FIG. 1.

The base 10 is inscribed in a plane P and the head 50 is inscribed in a plane P' perpendicular to the plane P (see FIG. 2).

The base 10 has a polygonal geometry which, in the example shown, is a pentagon with a transverse strand 101 connected to two parallel longitudinal strands 102; each longitudinal strand 102 is extended by an oblique strand 103.

The head 50 can have an M-shaped geometry formed by two coplanar legs 501. The two legs 501 are preferably non-parallel, as shown in the figures, but remain coplanar within the plan P'. One leg 501 is connected to an oblique strand 103, which provides the connection between the base 10 and the head 50, while the opposite leg 501' is oriented in a slightly divergent oblique manner in the direction of the base 10.

The head 50 also comprises a tip 503 formed by two strands 504 which converge from the end of the uprights 501 towards the base 10 and constitute the central part of the M.

A point worth noting is that the tip 503 itself lies in a plane P''' which is angularly offset by an angle α from the plane P as shown in FIG. 2. In practice, the angle α may be between 3° and 15°.

The head 50 may also be provided with a beak 506, which extends an upright 501' perpendicularly thereto.

Figure 4:
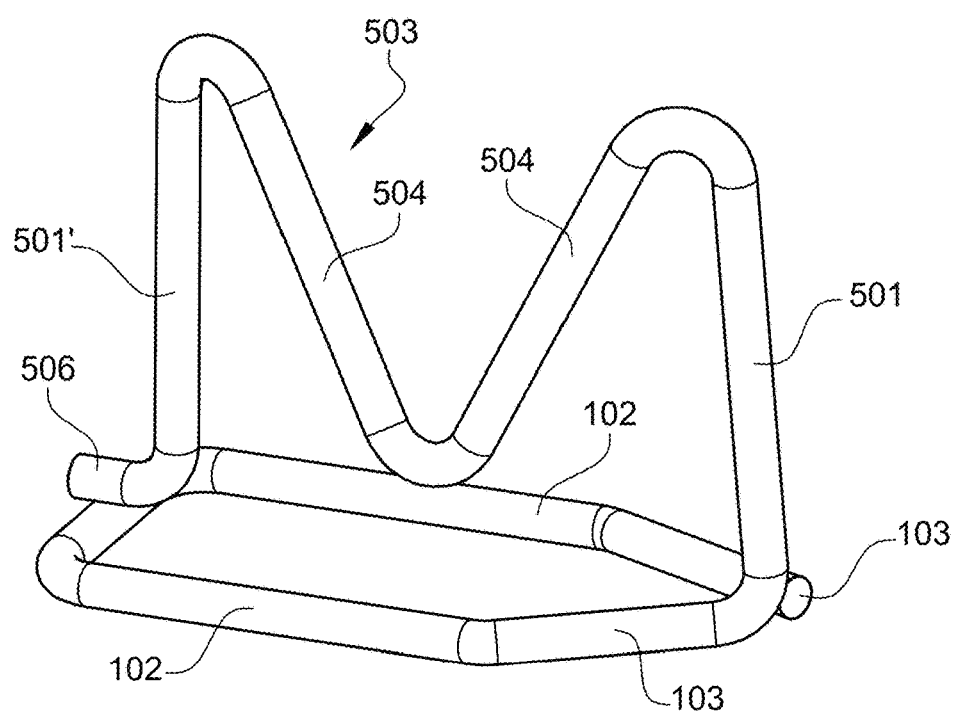
FIG. 4 is a view of a further embodiment of a mounting clip.
Figure 5:
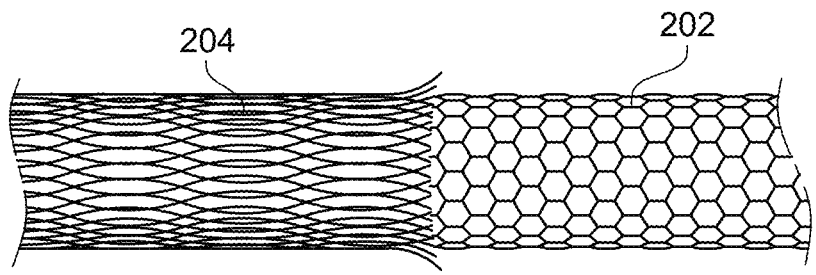
FIG. 5 is a view with partial tearing out of a domestic oven gasket.

FIG. 4 shows a variant in which the beak 506 can tangent the transverse strand 101 of the base 10. In other embodiments, the beak 506 is at a distance from the transverse strand 101 of the base 10.

The straight strands are connected by rounded portions formed by bending the segment of steel wire using a suitable tool.

The dimensions of the base may be, for example, of the order of 14 mm by 6 mm, while the head may be 12 mm high.

The gasket 200 may comprise a tubular inner metal mesh 202, and a textile braided jacket 204, which fits over the metal mesh 202. The braided jacket 204 can comprise a thermally insulating textile material adapted to withstand temperatures of the order of 400° C. to 500° C.; this braided jacket 204 may, for example, be made of glass fibres. An adhesive tape (not shown) may be provided at the ends of the gasket 200 to prevent the braid of the braided packing 204 from forming a fibre overgrowth.

Figure 6:
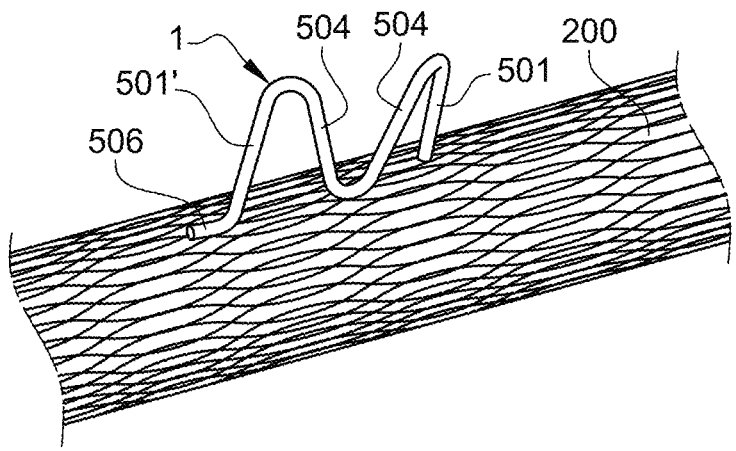
FIG. 6 is a view with partial tearing out of a domestic oven gasket.

In practice, a series of mounting clips 1 is inserted when the gasket 200 is braided during manufacture at a pitch corresponding to the distance between two oven openings. The base 10 is clamped between the wire mesh 202 and the braided jacket 204. As can be seen in FIG. 6, the beak 506 rests against the braided packing 204.

The gasket 200 fitted in this way can be fixed to the oven. To do this, the gasket 200 is brought close to the oven so that the clips 1 face the openings 300 in the oven structure or the oven door.

Figure 7:
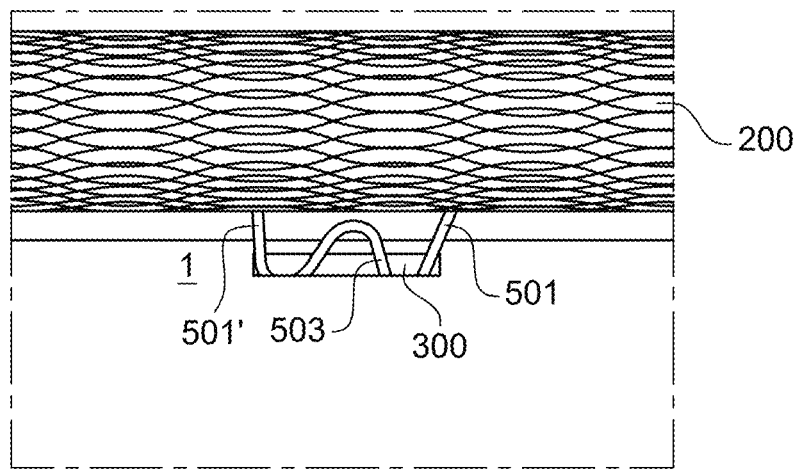
FIG. 7 is a view showing the fitting of a gasket in an opening in a domestic oven structure.

As shown in FIG. 7, the head 50 of the mounting clip is inserted into the opening. The tip 503 flexes towards the plane P', allowing it to be inserted into the opening 300, and the leg 501' flexes towards the leg 501. Once fully engaged in the opening 300, the tip 503 resiliently returns to its initial position and anchors the gasket 200.

If pulling force is exerted on the gasket 200, the point 503 will tend to move away from the plane P', which will reinforce the retention of the gasket 200.

Figure 8:
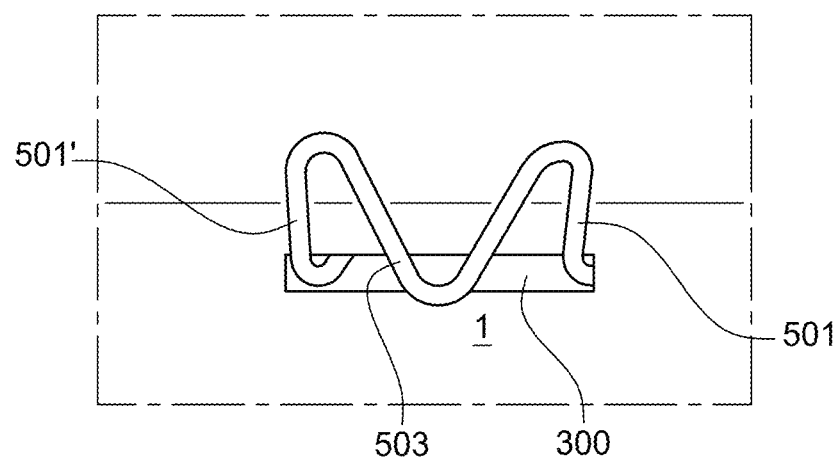
FIG. 8 is a view of an inside face of an oven structure showing a clip engaged in an opening.

As shown in FIG. 8, which shows the inside face of the oven structure, the mounting clip 1 provides longitudinal retention by means of the legs 501 and 501', which are constrained in this direction, and transverse retention by means of the tip 503, which bears against the inside surface of the oven structure, making it difficult for the gasket to be accidentally or intentionally removed. In addition, the mounting clip 1 prevents any play between the gasket 200 and the oven during the life of the oven.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A mounting clip for a domestic oven gasket formed in a segment of steel wire, the mounting clip comprising a base intended to be inserted into a braided tubular gasket, the base having a polygonal geometry inscribed in a plane P and, connected to the base, a head configured to be inserted into an opening made in an oven structure, the head having two legs inscribed in a plane P' orthogonal to the plane P and a tip formed by two strands which converge from an end of the two legs towards the base, the two strands oriented in a plane P''' which forms an acute angle $\alpha$ with the plane P'.

2. The mounting clip as claimed in claim 1, wherein the head has an upright connected to the base and an upright divergently oriented towards the base.

3. The mounting clip according to claim 1, wherein the base has a pentagonal geometry which comprises a transverse strand connected to two parallel longitudinal strands; each longitudinal strand is extended by an oblique strand, one of the oblique strands being connected to the head.

4. The mounting clip according to claim 3, wherein one leg of the two legs is connected to an oblique strand providing a connection between the base and the head, while an opposite leg of the two legs is oriented in a diverging oblique manner in a direction of the base.

5. The mounting clip according to claim 1, wherein the head is provided with a nose which extends an upright perpendicularly thereto.

6. The mounting clip according to claim 5, wherein the base has a pentagonal geometry which comprises a transverse strand connected to two parallel longitudinal strands; each longitudinal strand is extended by an oblique strand, one of the oblique strands being connected to the head and the nose is tangential to the transverse strand.

7. A thermal insulation gasket for a domestic oven, the thermal insulation gasket comprising at least one mounting clip according to claim 1.

* * * * *